A. R. MORSE.
CONTINUOUS COOKER OR EVAPORATOR.
APPLICATION FILED SEPT. 26, 1910.
1,153,170.
Patented Sept. 7, 1915.
5 SHEETS—SHEET 1.
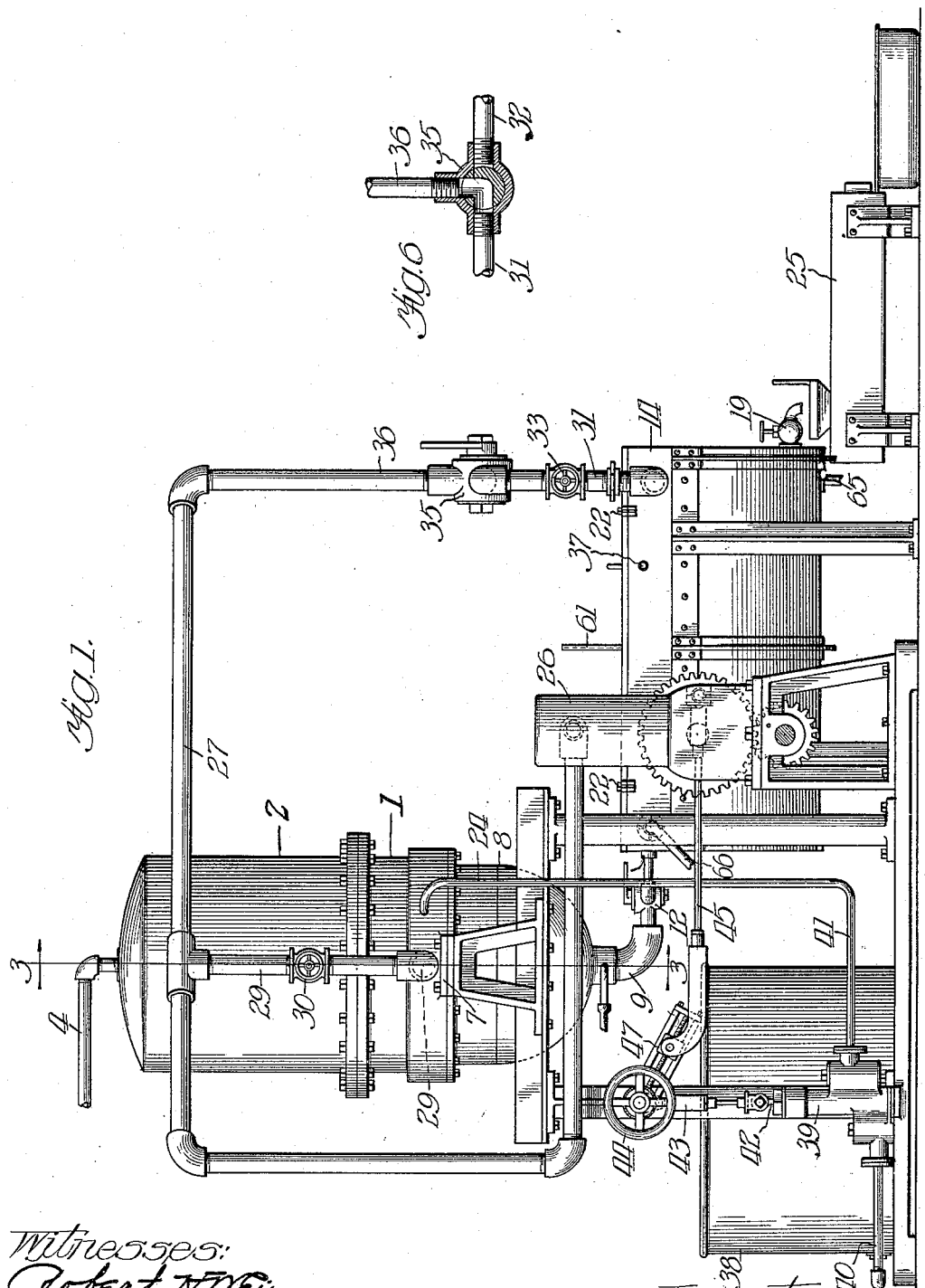

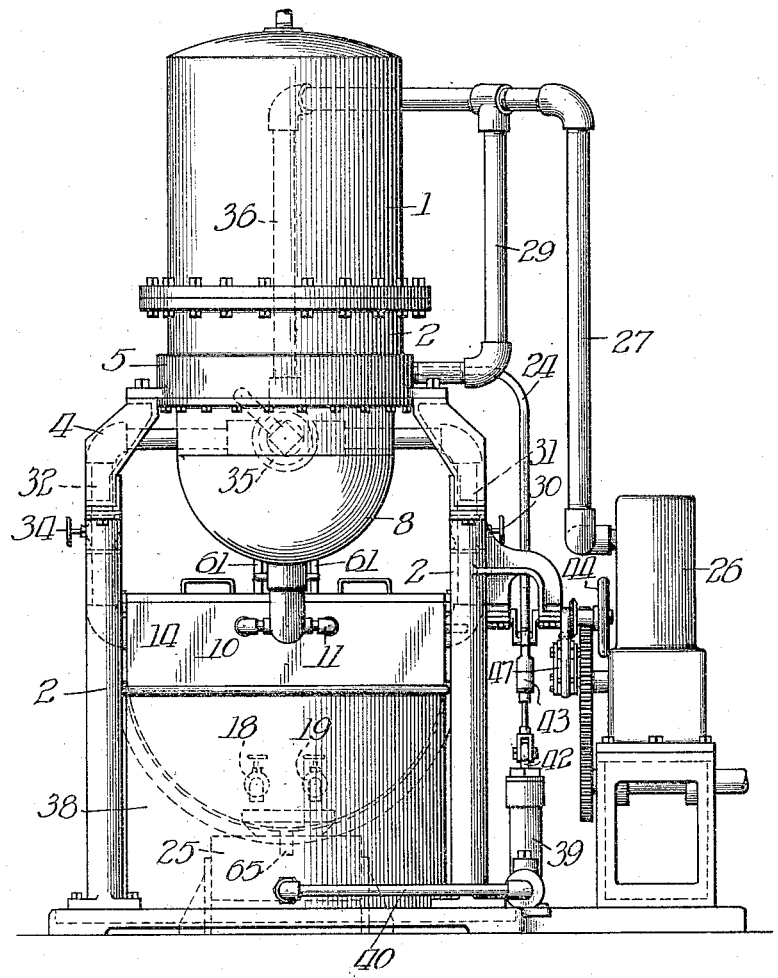

A. R. MORSE.
CONTINUOUS COOKER OR EVAPORATOR.
APPLICATION FILED SEPT. 26, 1910.
1,153,170.
Patented Sept. 7, 1915.
5 SHEETS—SHEET 3.
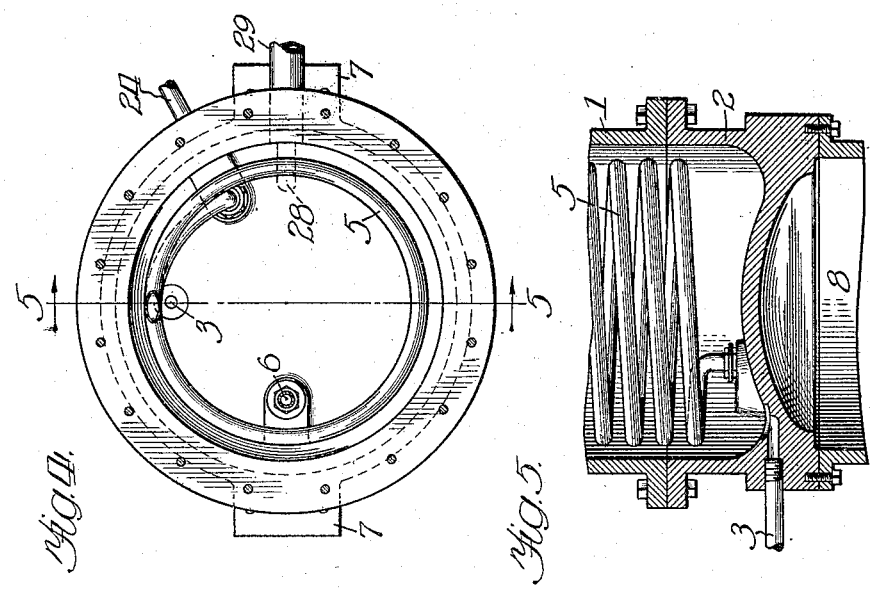
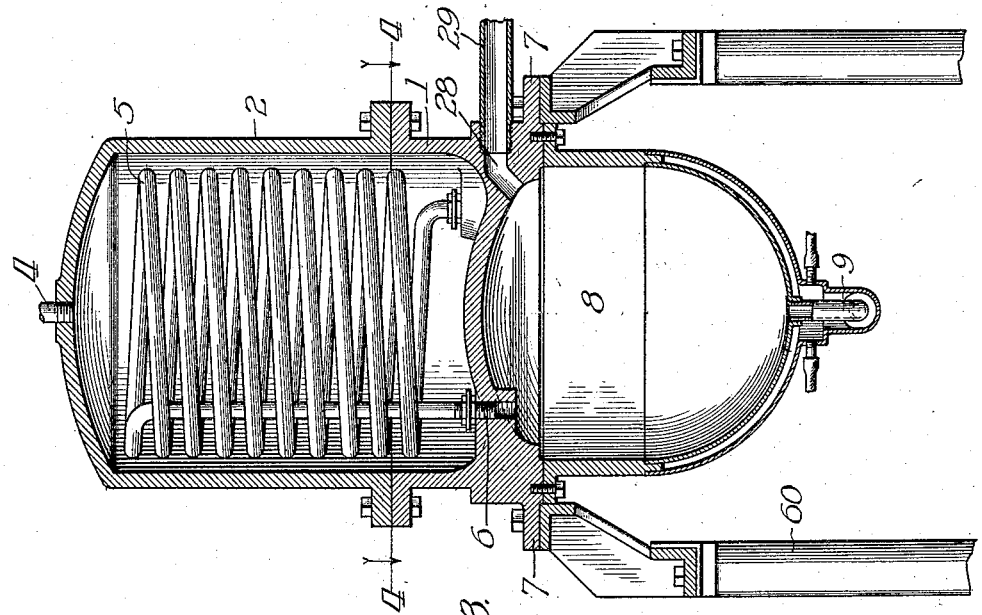

A. R. MORSE.
CONTINUOUS COOKER OR EVAPORATOR.
APPLICATION FILED SEPT. 26, 1910.
1,153,170.
Patented Sept. 7, 1915.
5 SHEETS—SHEET 4.
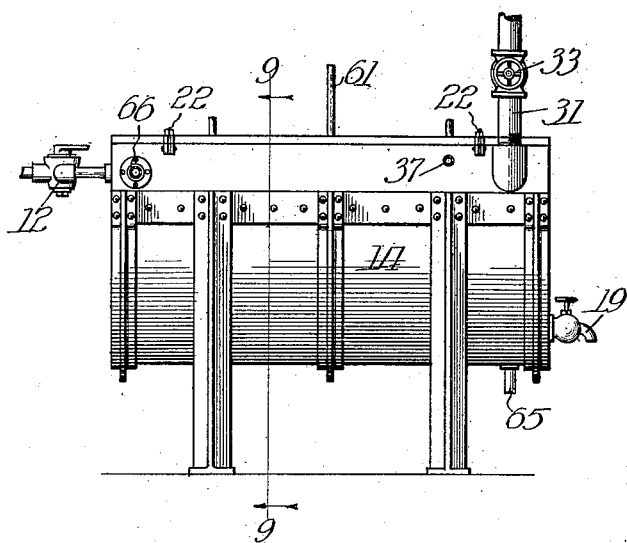
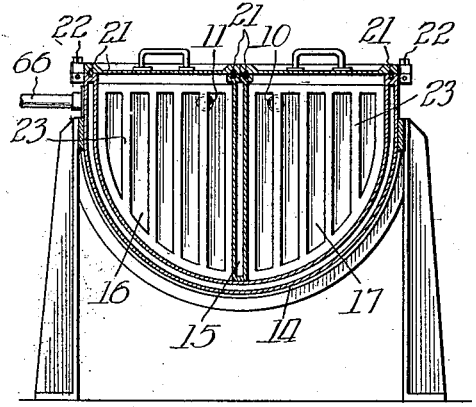
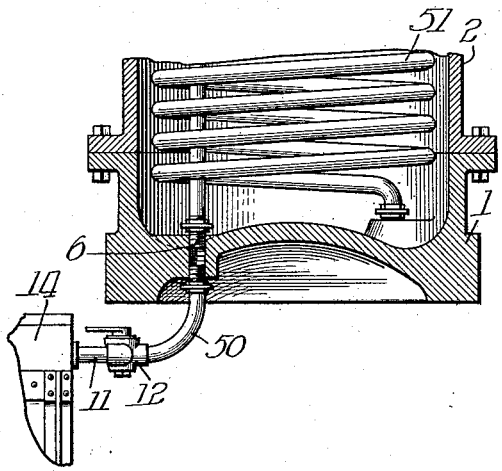

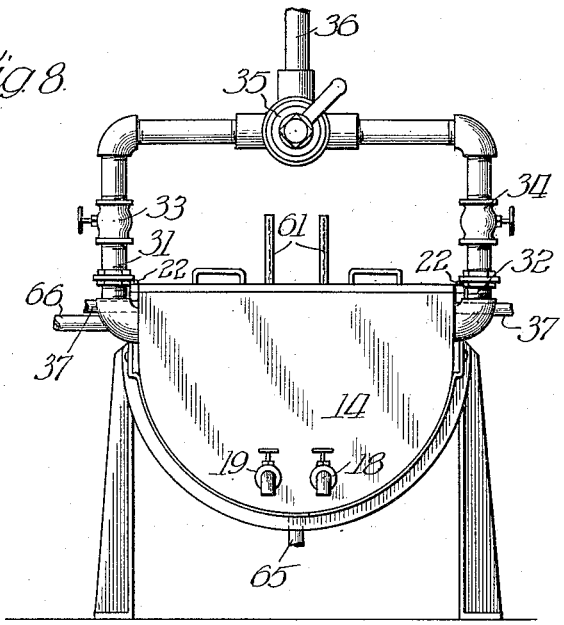
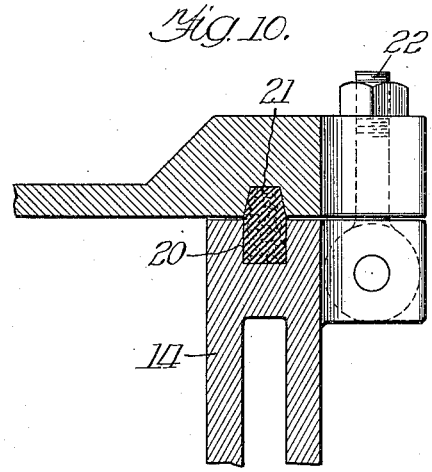

UNITED STATES PATENT OFFICE.

ARTHUR R. MORSE, OF CHICAGO, ILLINOIS.

CONTINUOUS COOKER OR EVAPORATOR.

1,153,170. Specification of Letters Patent. Patented Sept. 7, 1915.

Application filed September 26, 1910. Serial No. 583,738.

*To all whom it may concern:*

Be it known that I, ARTHUR R. MORSE, a citizen of the United States, residing at Chicago, in the county of Cook and State of Illinois, have invented certain new and useful Improvements in Continuous Cookers or Evaporators, of which the following is a description.

My invention relates to mechanism for cooking, concentrating or evaporating liquids, especially, for cooking syrup in the manufacture of candy, fondant or creams and the like.

The object of my invention is to produce a simple, convenient and thoroughly sanitary device of the kind described, wherein the cooking or concentrating proceeds continuously and results in a product which is practically absolutely uniform.

To this end my invention consists in the novel construction, arrangement and combination of parts herein shown and described, and more particularly pointed out in the claims.

In the accompanying drawings wherein like or similar reference characters indicate like or corresponding parts: Figure 1 is a side elevation of my device. Fig. 2 is an end elevation of the same. Fig. 3 is an enlarged section of the cooking chamber, taken substantially on line 3—3 of Fig. 1. Fig. 4 is a section taken substantially on line 4—4 of Fig. 3. Fig. 5 is a fragmentary section taken substantially on line 5—5 of Fig. 4. Fig. 6, is a sectional detail of a three-way controlling valve applicable for use in my device. Fig. 7, is a side elevation of the mixer for my device. Fig. 8 is an end view of the same. Fig. 9 is a section taken substantially on line 9—9 of Fig. 7. Fig. 10 is an enlarged sectional detail of the joint between the cover and walls of the mixing chamber. Fig. 11 is a fragmentary sectional detail showing a slightly modified form of my device.

In the form shown in the drawings, my device consists of a heater having a body part 1 and cap or cover part 2 suitably connected to form a cylindrical steam tight casing provided with a steam inlet 3 and an outlet 4. A tubular container 5 is provided upon the interior of the heater preferably arranged in a helical coil commencing at the liquid inlet port 24 at one side of the body piece 1 and winding upward in proximity to the wall of the cap 2 to a point near the top of the cap, thence directly downward within, and in close proximity to, the ascending coils to the outlet 6 in the body piece 1.

In the preferred construction the body piece is provided with a pair of laterally projecting flanges 7—7 each adapted to coöperate with a suitable frame or standard 60 to support the heater in position. An annular surface is provided upon the under side of the body piece 1 near its periphery adapted to coöperate with the upper face of a suitable receiver 8 to form a fluid tight joint. Any suitable means may be provided to secure the receiver in position. In the form shown the upper edge of the receiver is flanged outward and a plurality of capscrews are provided extending through suitable openings in the flange and engaging the body piece. In the preferred construction also the receiver 8 is provided with double walls suitably spaced from each other so that steam or other fluid may be circulated in the space between the inner and outer walls to control the temperature of the material in the receiver. In the form shown also an outlet pipe 9 is provided at the bottom of the receiver, the walls of which are also double as above explained. The lower end of the pipe 9 is branched or bifurcated as at 10—11 so that the cooked material in the receiver 8 may be discharged through the pipe 10 or 11 as desired. A suitable three-way valve 12 is provided at the junction of the pipes 9, 10 and 11 to control the flow of material through the pipes and direct the same to either the pipe 10 or 11 as may be necessary.

Any suitable means may be provided for disposing of the cooked material discharged from the pipes 10 and 11. In the form shown, a mixer 14 is provided, the interior of which is divided by a substantially vertical partition 15 into two independent mixing chambers 16 and 17, and the pipes 10 and 11 are connected to the chambers 16 and 17 respectively. Outlet valves 18 and 19 are provided at the opposite end of the respective mixing chambers so that material entering the chambers at one end may be discharged when desired at the opposite end.

In the preferred construction, the walls of the mixer 14 and the partition 15 are double and suitably spaced from each other so that a fluid of suitable temperature may be circulated in the space between the walls to partially control the temperature of the material in the mixer. The inlet pipe 65 attached to the bottom of the mixer and the outlet pipe 66 near the top at the opposite end are provided to direct the circulating liquid to and from the device respectively. In the form shown also the upper edge of the walls of the mixer 14 and of the partition 15 are each provided with a recess 20 adapted to receive a suitable resilient packing material 21 preferably of sufficient width to project slightly above the faces of the walls, and an independent cover for each of the chambers 16 and 17 is provided having a part adapted to coöperate with the packing material 21 to form an air tight closure between the walls and the covers which may, if desired, be rigidly secured in position by suitable bolts and nuts 22 or other convenient locking means. In the preferred construction also a plurality of tubular radiators or gratings 23 are provided in each to more effectually control the temperature of the material in the mixer.

From the foregoing description it will be noted that my device consists of a substantially continuous duct or passage commencing at the liquid inlet 24 and comprising the coil 5 of the heater down to the receiver 8 which in effect is merely a chamber or an enlargement of the passage where the pressure upon the material may be reduced to facilitate evaporation and permit the gases and vapor produced in the cooking of the material to be removed. From the receiver 8 the material passes by the pipes 9 and 10 or 11 as the case may be, to one of the mixing chambers 16 or 17, which also is in effect, merely a chamber or an enlarged portion of the passage where the pressure may be further reduced and from which the material is discharged at the outlet 19 or 18 and may, if desired, be received in a suitable beater 25 or other mechanism for continuing the preparation of the material.

Any suitable means may be provided to remove the vapor and gases produced by the cooking or heating of the material and to maintain a partial vacuum in the container to provide for the maximum evaporation at the minimum temperature. In the preferred construction an air pump 26 or other suitable exhauster is provided, the suction pipe 27 of which extends upward to a point near the top of the cap 2 and from that point is connected in any suitable manner to the receiver 8 and the mixing chambers 16 and 17. In the form shown a port 28 is provided in the body piece 1 extending to the interior of the receiver 8 and connected by a suitable pipe 29 to the pipe 27. A valve 30 or other convenient means is provided in the pipe 29 to partially control the pressure upon the interior of the receiver. A pair of pipes 31 and 32 are connected to the upper sides of the chambers 16 and 17 respectively near the discharge end of the chambers and provided with suitable valves 33 and 34 respectively. The pipes 31 and 32 are each preferably connected by a three-way valve 35 or equivalent means to a pipe 36 which is in turn connected to the pipe 27. By this arrangement it will be noted that sufficient vacuum may be maintained upon the receiver 8 to considerably increase the rate of evaporation and to carry off all vapor and gases, and also to assist in producing the desired movement of the material in the coil 5. By the proper manipulation of the valves 12 and 35 material from the receiver 8 may be discharged into either of the mixing chambers 16 or 17 and at the same time the pressure at that particular chamber may be reduced as desired to still further increase the rate of evaporation and to free the material of vapor and gases and assist in the discharge of the material from the receiver into the mixing chamber. As soon as the chamber thus connected is sufficiently full of material which is preferably indicated by a float gage 61 upon each chamber, the valves 12 and 35 may be operated to produce the same conditions in the other mixing chamber while the outlet of the full chamber may be opened permitting the material to escape. The material while in the chamber is thoroughly freed from vapor and gases and in its passage along the chamber and through the several radiators or grates 23 is thoroughly mixed thereby securing a substantially uniform product free from the odors or taste of gas or vapor which may be discharged from the mixing chamber at substantially any desired temperature. Where the material is comparatively hard or sticky or where for any reason it is desired to hasten the discharge of the material from the mixing chamber, an air pipe 37 may be connected to the upper side of each chamber so that air under pressure may be admitted to either chamber to force the material through the outlet opening.

In the preferred construction a tank or reservoir 38 is provided to receive the syrup or other material to be cooked or evaporated and a force pump 39 is provided connected by a pipe 40 to the tank 38 and by a pipe 41 to the liquid supply port 24 in the body piece 1. The office of the pump 39 is to control the supply of material to my device and where the material is sufficiently concentrated in the coil 5 to render its passage through the coil difficult or uncertain, to insure a regular steady movement of the material through the coil. The pump 39 may be of any desired construction and operated in any desired manner. As shown an ordinary plunger pump is shown with its plunger 42 attached by a suitable connecting rod to a crank 44 which is in turn oscillated by a connecting rod 45 attached at one end to a crank 46 upon the air pump 26 and at its opposite end to an arm 47 rigidly secured to the crank 44 and having suitable means provided for adjusting the longitudinal position of the pivotal connection between the rod 45 and the arm to control the movement of the crank 44 and thereby the stroke of the pump. In the form of my device shown in Fig. 11 the several parts are in all respects substantially as hereinbefore described, except that the receiver 8 is entirely omitted and the descending portion 50 of the coil 51 corresponding to the coil 5 hereinbefore described, is connected at its lower end directly to the valve 12 for directing the material into the mixer 14. In this form obviously the port 28 and pipe 29 are not required and all of the vapor and gas is removed from the product during the mixing operation. In all other respects the operation of the device is substantially the same as hereinbefore described.

In either form of my device a remarkably uniform product is secured and the operation of the mechanism is continuous, the material is at all times wholly inclosed and protected from dust, germs, or other foreign matter, and no manipulation by hand is required nor the use of transfer vessels, paddles or other device of the kind liable to become contaminated.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. A continuous cooker or evaporator, comprising an externally heated container having an inlet and an outlet, and means controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

2. A continuous cooker or evaporator, comprising an externally heated elongated tubular container having an inlet and an outlet, and means for controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

3. A continuous cooker or evaporator, comprising an externally heated container having an inlet and an outlet at its respective ends, and means for controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

4. A continuous cooker or evaporator, comprising an externally heated container having an inlet and an outlet and a pump for controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

5. A continuous cooker or evaporator, comprising an externally heated container having an inlet and an outlet, and means for controlling the flow of liquid through said container, in combination with a pair of temperature controlling chambers, means for controlling the temperature of said chambers, and means for connecting said container to said temperature controlling chambers, means for directing the material from said container to either of said chambers, and means for maintaining a partial vacuum in either of said temperature controlling chambers.

6. A continuous cooker or evaporator, comprising an externally heated container having an inlet and an outlet, and means for controlling the flow of liquid through said container, in combination with a pair of substantially independent temperature controlling chambers, means for connecting said container to said temperature controlling chambers, means for directing the material from said container to either of said chambers, and means for maintaining a partial vacuum in either of said temperature controlling chambers.

7. A continuous cooker or evaporator, comprising an externally heated container having an inlet and an outlet, and means for controlling the flow of liquid through said container, in combination with a pair of temperature controlling chambers, means at said outlet for connecting said container to said temperature controlling chambers, means for directing the material from said container to either of said chambers, and means for maintaining a partial vacuum in either of said temperature controlling chambers.

8. A continuous cooker or evaporator, comprising an externally heated container having an inlet and an outlet, and means for controlling the flow of liquid through said container, in combination with a pair of temperature controlling chambers, a receiver, and means coöperating with said receiver for connecting said container to said temperature controlling chambers, means for directing the material from said receiver to either of said chambers, and means for maintaining a partial vacuum in either of said temperature controlling chambers.

9. A continuous cooker or evaporator, comprising an externally heated container having an inlet and an outlet, and means for controlling the flow of liquid through said container, in combination with a pair of temperature controlling chambers, a receiver, and means coöperating with said receiver for connecting said container to said temperature controlling chambers, means for directing the material from said receiver to either of said chambers, and means for maintaining a partial vacuum in said receiver and in either of said temperature controlling chambers.

10. A continuous cooker or evaporator, comprising an externally heated elongated tubular container having an inlet and an outlet at its respective ends, and means for controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

11. A continuous cooker or evaporator, comprising an externally heated elongated tubular container having an inlet and an outlet at its respective ends and a pump for controlling the flow of liquid through said container, in combination with a pair of temperature controlling chambers, means for connecting said container to said temperature controlling chambers, means for directing the material from said container to either of said chambers, and means for maintaining a partial vacuum in either of said temperature controlling chambers.

12. A continuous cooker or evaporator, comprising an externally heated elongated tubular container having an inlet and an outlet at its respective ends and a pump for controlling the flow of liquid through said container, in combination with a pair of temperature controlling chambers, means for controlling the temperature in said temperature controlling chambers, and means for connecting said container to said temperature controlling chambers, means for directing the material from said container to either of said chambers, and means for maintaining a partial vacuum in either of said temperature controlling chambers.

13. A continuous cooker or evaporator, comprising an externally heated elongated tubular container having an inlet and an outlet at its respective ends and a pump for controlling the flow of liquid through said container, in combination with a pair of substantially independent temperature controlling chambers, means for controlling the temperature in said temperature controlling chambers, and means for connecting said container to said temperature controlling chambers, means for directing the material from said container to either of said chambers, and means for maintaining a partial vacuum in either of said temperature controlling chambers.

14. A continuous cooker or evaporator, comprising an externally heated elongated tubular container having an inlet and an outlet at its respective ends, and means for controlling the flow of liquid through said container, in combination with a pair of temperature controlling chambers, means for controlling the temperature in said temperature controlling chambers, and means for connecting said container to said temperature controlling chambers, means for directing the material from said container to either of said chambers, and means for maintaining a partial vacuum in either of said temperature controlling chambers.

15. A continuous cooker or evaporator, comprising an externally heated elongated tubular container having an inlet and an outlet at its respective ends, and means for controlling the flow of liquid through said container, in combination with a pair of temperature controlling chambers, means for controlling the temperature in said temperature controlling chambers, and means at said outlet for connecting said container to said temperature controlling chambers, means for directing the material from said container to either of said chambers, and means for maintaining a partial vacuum in either of said temperature controlling chambers.

16. A continuous cooker or evaporator, comprising an externally heated elongated tubular container having an inlet and an outlet at its respective ends, and means for controlling the flow of liquid through said container, in combination with a pair of temperature controlling chambers, means at said outlet for connecting said container to said temperature controlling chambers, means for directing the material from said container to either of said chambers, and means for maintaining a partial vacuum in either of said temperature controlling chambers.

17. A continuous cooker or evaporator, comprising an externally heated elongated tubular container having an inlet and an outlet at its respective ends, and means for controlling the flow of liquid through said container, in combination with a pair of temperature controlling chambers, a receiver at said outlet and means coöperating with said receiver for connecting said container to said temperature controlling chambers, means for directing the material from said receiver to either of said chambers, and means for maintaining a partial vacuum in either of said temperature controlling chambers.

18. A continuous cooker or evaporator, comprising an externally heated elongated tubular container having an inlet and an outlet at its respective ends, and means for controlling the flow of liquid through said container, in combination with a pair of temperature controlling chambers, a receiver at said outlet and means coöperating with said receiver for connecting said container to said temperature controlling chambers, means for directing the material from said receiver to either of said chambers, and means for maintaining a partial vacuum in said receiver and in either of said temperature controlling chambers.

19. A continuous cooker or evaporator, comprising an externally heated elongated tubular container having an inlet and an outlet at its respective ends and a pump for controlling the flow of liquid through said container, in combination with a pair of substantially independent temperature controlling chambers, means for controlling the temperature in said temperature controlling chambers, a receiver at said outlet, and means coöperating with said receiver for connecting said container to said temperature controlling chambers, means for directing the material from said receiver to either of said temperature controlling chambers and means for maintaining a partial vacuum in said receiver and in either of said temperature controlling chambers.

20. A continuous cooker or evaporator, comprising an externally heated elongated tubular container having an inlet and an outlet at its respective ends, and means for controlling the flow of liquid through said container, in combination with a pair of temperature controlling chambers, means for controlling the temperature in said temperature controlling chambers, a receiver at said outlet and means coöperating with said receiver for connecting said container to said temperature controlling chamber, means for directing the material from said receiver to either of said chambers, and means for maintaining a partial vacuum in either of said temperature controlling chambers.

21. A continuous cooker or evaporator, comprising an air tight duct having a body portion and a plurality of chambers or enlargements intermediate its ends, means for controlling the temperature of the body portion of said duct and independent means for controlling the temperature of said chambers, in combination with means for controlling the flow of fluid through said duct, and means for maintaining a partial vacuum in each of said chambers.

22. A continuous cooker or evaporator, comprising an air tight duct having a body portion and a plurality of chambers or enlargements intermediate its ends, means for controlling the temperature of the body portion of said duct, and independent means for controlling the temperature of each of said chambers, in combination with a pump for controlling the flow of fluid through said duct, and means for maintaining a partial vacuum in each of said chambers.

In testimony whereof, I have hereunto signed my name in the presence of two subscribing witnesses.

ARTHUR R. MORSE.

Witnesses:
BLANCHE CHALMERS,
BURTON U. HILLS.

Copies of this patent may be obtained for five cents each, by addressing the "Commissioner of Patents, Washington, D. C."